(12) United States Patent
Lee

(10) Patent No.: US 9,924,131 B1
(45) Date of Patent: Mar. 20, 2018

(54) SYSTEM AND METHOD FOR AUTOMATIC VIDEO SCALING

(71) Applicant: Samsung Display Co., Ltd., Yongin, Gyeonggi-Do (KR)

(72) Inventor: Janghwan Lee, Pleasanton, CA (US)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/374,976

(22) Filed: Dec. 9, 2016

Related U.S. Application Data

(60) Provisional application No. 62/397,825, filed on Sep. 21, 2016.

(51) Int. Cl.
| | | |
|---|---|---|
| *H04N 7/01* | (2006.01) | |
| *G06K 9/46* | (2006.01) | |
| *H04N 5/262* | (2006.01) | |
| *G06K 9/62* | (2006.01) | |

(52) U.S. Cl.
CPC ......... *H04N 7/0122* (2013.01); *G06K 9/4604* (2013.01); *G06K 9/4671* (2013.01); *G06K 9/6215* (2013.01); *H04N 5/2628* (2013.01); *G06K 2009/4666* (2013.01)

(58) Field of Classification Search
CPC .. H04N 7/0122; H04N 5/2628; G06K 9/4604; G06K 9/4671; G06K 9/6215; G06K 2009/4666

USPC .......................................................... 348/445
See application file for complete search history.

(56) References Cited

U.S. PATENT DOCUMENTS

| | | | |
|---|---|---|---|
| 8,284,311 B2 | 10/2012 | Dunton | |
| 8,471,902 B2 | 6/2013 | Kang et al. | |
| 8,711,198 B2 | 4/2014 | Malzbender | |
| 9,332,254 B2 | 5/2016 | Wang et al. | |
| 9,380,297 B1 | 6/2016 | Djurdjevic | |
| 9,396,393 B2 | 7/2016 | Stojancic | |
| 2005/0151884 A1* | 7/2005 | Oh | H04N 5/2628 348/576 |
| 2007/0024706 A1 | 2/2007 | Brannon, Jr. | |
| 2008/0084503 A1* | 4/2008 | Kondo | G09G 5/005 348/556 |
| 2008/0088740 A1* | 4/2008 | Kondo | H04N 5/44591 348/556 |
| 2015/0237166 A1 | 8/2015 | Denoual et al. | |
| 2015/0350659 A1 | 12/2015 | Auyeung | |

* cited by examiner

*Primary Examiner* — Michael Lee
(74) *Attorney, Agent, or Firm* — Innovation Counsel LLP

(57) ABSTRACT

A method of identifying and scaling a region of interest on a display device is presented. The region of interest is detected based on the rate of change between frames. A size of the display area of the display device and aspect ratio are determined. The detected region of interest is scaled to fit the display area in full screen mode based on the display area and the aspect ratio. The region of interest may be, for example, an active video region. In full screen mode, any static or slow-moving images are hidden.

20 Claims, 6 Drawing Sheets

SYSTEM AND METHOD FOR AUTOMATIC VIDEO SCALING

RELATED APPLICATION

This application is related to and claims the benefit of U.S. Provisional Patent Application 62/397,825, entitled "A System and Method for Automatic Video Scaling" filed on Sep. 21, 2016. The provisional application is hereby incorporated by reference for all purposes.

BACKGROUND

With the growth of Internet streaming services and online media sites such as YouTube, Netflix, Hulu, and Amazon, among others, wireless streaming technologies are becoming ever more popular, allowing users to stream digital media from a network-attached device to a display device. Wireless streaming technologies such as MiraCast, WiDi, ChromeCast, AirPlay are supported by a wide range of televisions, sticks, dongle, and set-top boxes, and are able to stream media from network-attached devices to a display device without the hassle of establishing wired connections. The network-attached device may include mobile phones, tablets, or smart TV. Video source information from the network-attached device is cast to a display device, which may also have wireless capabilities.

In some cases, video content from streaming services include an active video region surrounded by a background image, which is either a static image or a series of slowly updating images. In many, if not most cases, the user is only interested in viewing the content of the active video region and is not interested in viewing the surrounding background image, yet the active video region is not scaled to full screen.

A method for identifying an active video region of streaming video and automatically scaling the active video region is desired.

SUMMARY

A method of identifying and scaling a region of interest on a display device is presented. The region of interest is detected based on the rate of change between frames. A size of the display area of the display device and aspect ratio are determined. The detected region of interest is scaled to fit the display area in full screen mode based on the display area and the aspect ratio.

BRIEF DESCRIPTION OF THE DRAWING

These and other features and advantages of the present invention will be appreciated and understood with reference to the specification, claims, and appended drawings wherein:

DETAILED DESCRIPTION

The detailed description set forth below, in connection with the appended drawings, is intended as a description of exemplary embodiments of a system and method for detecting and scaling up a region of interest to display in full screen mode. The description sets forth the features of the inventive technique in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Embodiments of the present inventive concept provide a system and method for automatic video scaling. The disclosure pertains to a technique for processing input data to identify a region of interest (ROI) from a video content in a display system. The disclosure provides a method for determining a video region to be scaled and a zoom factor from the detected ROI to output display. The disclosure provides a method for automatically adjusting video center and zoom factor according to size of the display area, such that region of interest is mapped to the whole display area in full screen mode. The region of interest may be a region that shows active video content. The disclosure includes a method for accurately detecting the region of interest, for example based on a rate of data change using accumulated difference data. The disclosure also includes a method for applying the region of interest to the full display size with aspect ratio adjustment. In some embodiments, a user interface for selecting the ROI and adjusting region of interest to full display area size is provided.

Figure 1:
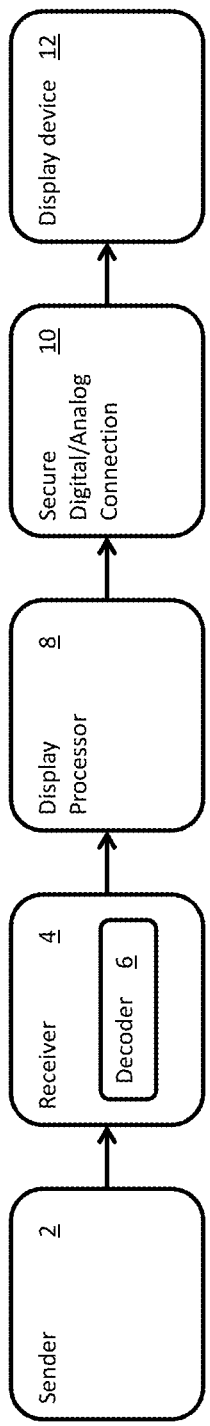
FIG. 1 depicts an example wireless display receiver block diagram according to one embodiment.

FIG. 1 depicts the functional relationship among components of an example wireless display system.

A sender 2, which transmits video and/or audio data to be displayed, has capabilities to be attached to a network, such as the Internet, via wireless or wired means. The sender 2 is further capable of being configured to handle wireless communication with a receiver 4 by implementing a wireless streaming technology. For example, the sender 2 may be configured to operate using ChromeCast (Google Cast), AirPlay, MiraCast, WiDi, or any other like technology. The sender 2 may include a server, a computer, a mobile device such as a smartphone or a tablet, or any other device with the above-described capabilities. The sender 2 is often not physically connected to the receiver 4.

The sender 2 may include a sender app running on the sender device. The sender app may allow a user to select which display device content is to be displayed on, have media controls such as play/pause/record functionalities, and/or allow content discovery by the user.

The receiver 4 may receive digital media from the sender. The digital media may include video data (e.g. in a format such as MPEG2 or MPEG4, or the like) and/or audio data (e.g. in a format such as MP3, AAC, AC3, or the like) which is to be streamed. The receiver 4 may be configured to operate using a wireless streaming technology (as listed above for the sender 2) corresponding to the wireless display technology used by the sender 2. The receiver 4 may be a device such as a Chromecast dongle, Apple TV, a personal computer.

The receiver 4 may include a decoder 6. The decoder 6 may include codecs included on a system on a chip (SoC) which is contained in the receiver. The codecs have the capability to decode video/audio compression formats of the video/audio data. After the codecs decode the compressed video/audio data so that the video/audio data becomes uncompressed, the receiver 4 may feed the uncompressed video/audio data to a display processor 8.

The display processor 8 may be configured to perform video enhancement and other processing related to displaying the video. The video is then output to the display device 12 via a secure digital/analog connection 10 (e.g. a HDCP compliant connection).

Figure 2:
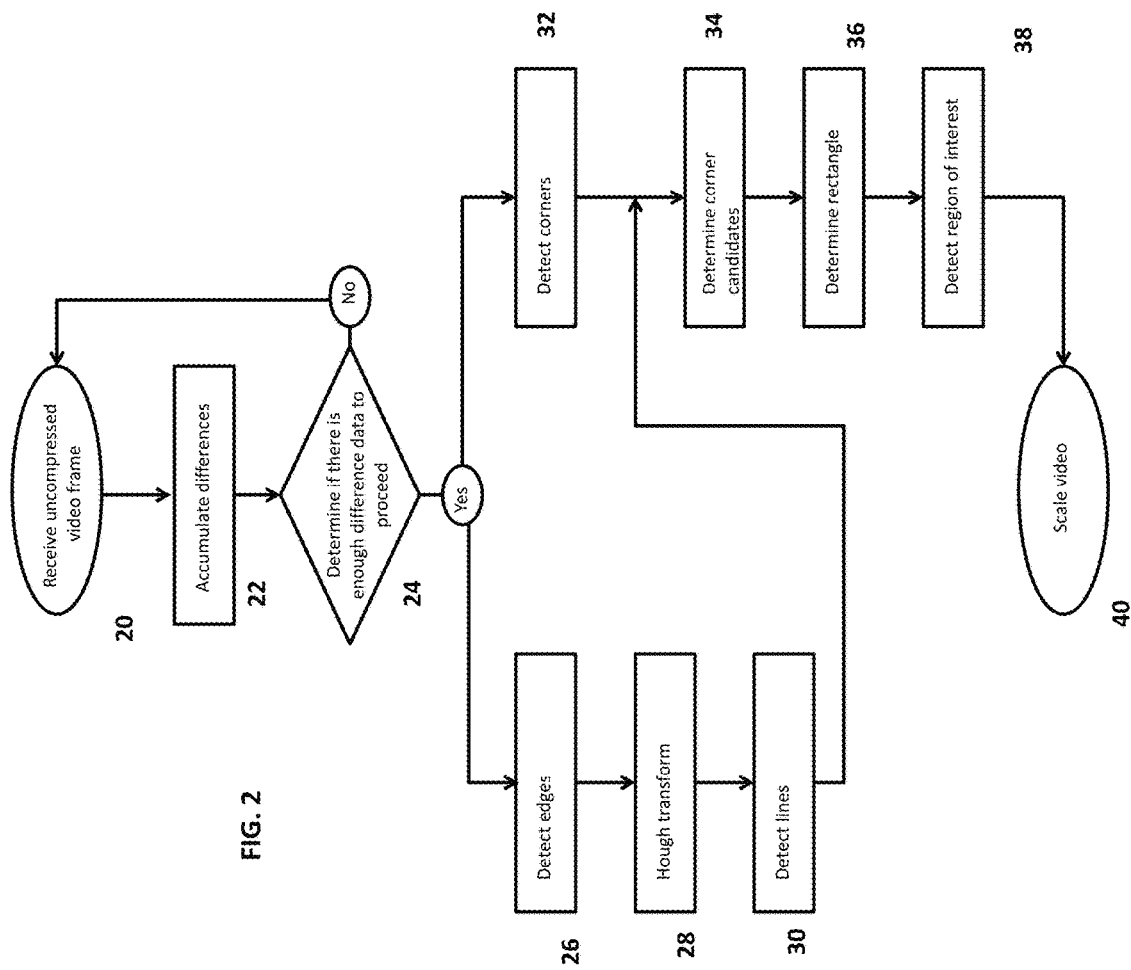
FIG. 2 includes a flowchart depicting a region of interest detection process according to one embodiment.

FIG. 2 includes a flowchart depicting an embodiment of region of interest detection process. The input from video decoder 6 allows the system to receive an uncompressed video frame. The system accumulates differences between a plurality of frames.

As shown in FIG. 2, the system receives at least two uncompressed video frames that are sequentially generated from the receiver (20). Then, the system accumulates differences between the at least two uncompressed video frames (22). This difference accumulation process (22) is detailed further below in reference to FIG. 3.

Subsequent to accumulating differences (22), the system determines if there is enough difference data to proceed with identifying the region of interest (24). In one embodiment, the system makes this determination by comparing the value stored in the accumulated difference buffer with a difference threshold. The difference threshold is a predefined, selected value which corresponds to a high enough difference data value to identify a region of interest. By comparing the value of the accumulated difference buffer with the difference threshold, the system helps ensure that the system has enough information to identify the region of interest. If the system determines there is not enough difference data to proceed, then the system loops back to receive another uncompressed video frame.

According to another embodiment, the system does not calculate the accumulated difference, but instead proceeds once a threshold number of frames have been displayed. However, this method with frame counts may be affected by the amount of activity in the content of video stream. For example, if the video being displayed has a very static image(s), the threshold number of frames would be adjusted up.

If the system determines there is enough difference data to proceed, then the system proceeds down a left path of the flow chart and a right path of the flow chart. Parts of the left and right branches of the flowchart may be executed sequentially or simultaneously. On the left path, the system performs edge detection on the accumulated difference data to obtain an edge binary image output (26). Then, Hough transform is applied to the edge binary image output (28) to obtain lines from the edge binary image output. In one embodiment, the system detects only lines (e.g., straight lines) extending at an angle of around 0 and 90 degrees with respect to a first direction, where the first direction may be parallel to a longer side of the video. However, the present inventive concept is not limited thereto. For example, the system may assume that the region of interest may be displayed with a straight-line boundary that extends at an arbitrary angle with respect to the first direction.

On the right path of the flow chart of FIG. 2, the system performs corner detection on the accumulated difference data to obtain potential corner locations (32). Then, the system matches up the potential corner locations with the detected lines (30) from the edge binary image output (34), and applies a rectangle rule to eliminate potential corner locations that are not matched with a line (36). The rectangle rule dictates that the corner candidates selected must form a rectangle. Thus, each corner candidate must have two perpendicular lines, provided by the Hough transform, and two counter corners, the lines. The two counter corners are corners located at an endpoint of each respective line, where each endpoint is not located at the vertex of the two perpendicular lines. After determining the corner candidates, the system identifies a rectangle outlining a region of interest candidate and determines the region of interest (38). The system can then scale the region of interest using the display area spec that was previously received and displays the scaled region of interest to the full display area (40).

Figure 3:
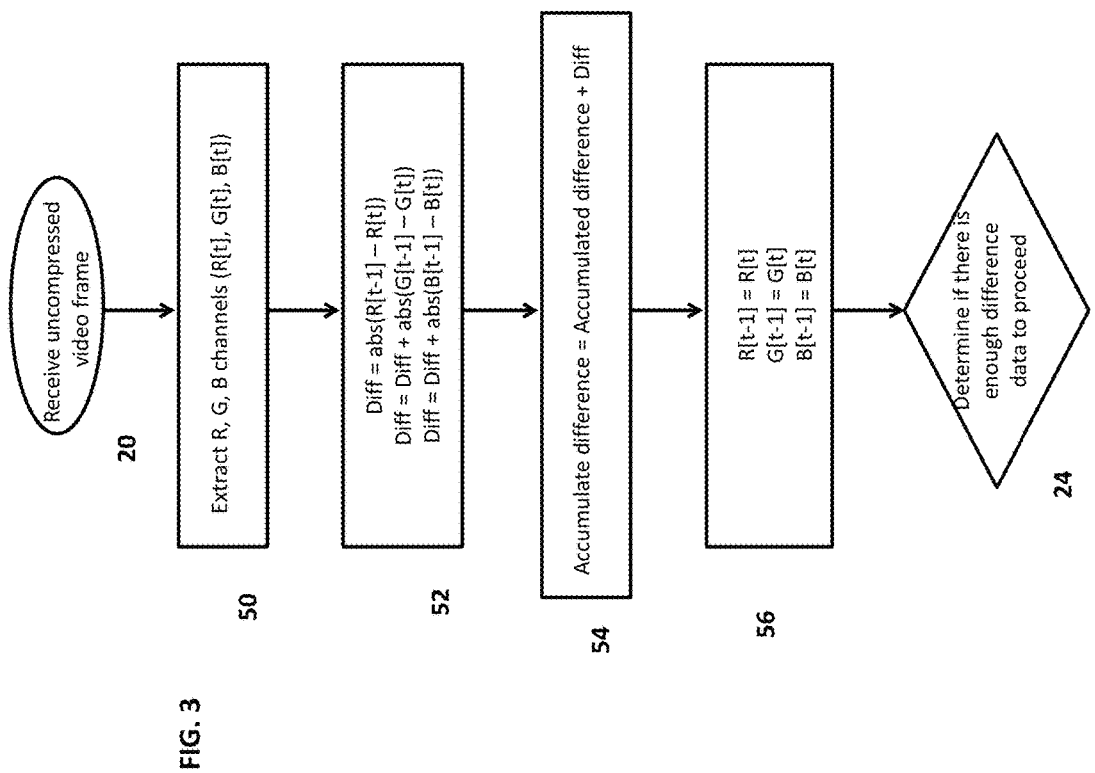
FIG. 3 depicts a flowchart that shows details of the difference accumulation process according to one embodiment.

FIG. 3 depicts a flowchart that shows details of the difference accumulation process 22 between frames. The difference accumulation process 22, in one aspect, measures the rate of data change over a number of frames. Stages 50 through 56 are part of the process 22 shown in FIG. 2. Once the system receives the uncompressed video frame, the system extracts data from each of the R, G, and B channels of the current frame at time t (50). The data of each current channel R(t), G(t), and B(t) is respectively subtracted from the data of each last channel R(t-1), G(t-1), and B(t-1) channel (herein also referred to as data of a first prior frame t-1 for respective R, G, and B channels), and each difference (Diff) is added to a difference buffer Diff (52). At this point, the parameter "Accumulated Difference" may be a sum of the differences between a number of previous channels, for example R(t-2), R(t-3), and R(t-4) for the R channel (which are herein also referred to as data of a second, third, and fourth prior frames for the R channel). This "Accumulated Difference" is updated to include the latest Diff (54). If a static image is being displayed, the Accumulated Difference may stay roughly zero for a large number of frames. However, but if a video is being displayed, the Accumulated Difference may grow rapidly. Once the difference buffer Diff is added to the Accumulated Difference, each of the current values R(t), G(t), and B(t) are redefined as values of the previous channels R(t-1), G(t-1), and B(t-1) to extract updated current values from the channels (56).

Figure 4:
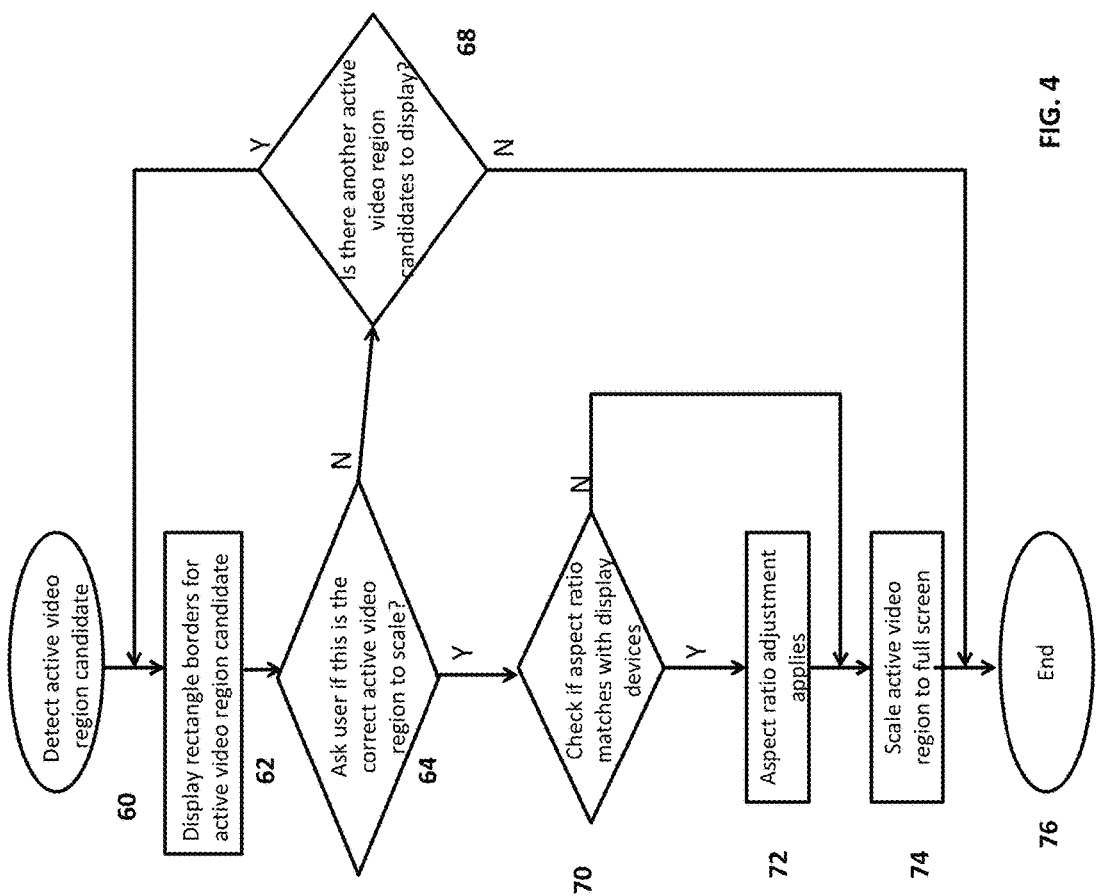
FIG. 4 depicts a region of interest scaling method according to one embodiment.

FIG. 4 depicts a region of interest scaling process according to one embodiment. After identifying a region of interest candidate (60, or 38 in FIG. 2), a region of interest candidate border is shown as a rectangle (62) and the user is asked whether the detected region is correct to scale to full screen (64). If the region of interest candidate is not the correct region to scale, the system will look for an additional region of interest candidate (68). If the system finds an additional candidate, the system will display the additional candidate to the user for selection. On the other hand, if the region of interest candidate is the correct region to scale to full screen, the system will confirm the aspect ratio of the display device (70) and adjust the aspect ratio of the video if necessary (72). The system may determine the aspect ratio based on the device type, which may be detected or provided by the user. The region of interest is then scaled to be displayed full screen on the display device (74).

Although not depicted, if the region of interest is tilted (such that no edge extends parallel to the edge of the display device), the system will perform a rotation to align the region of interest either following or preceding scaling of the region of interest to full screen.

Figure 5A:
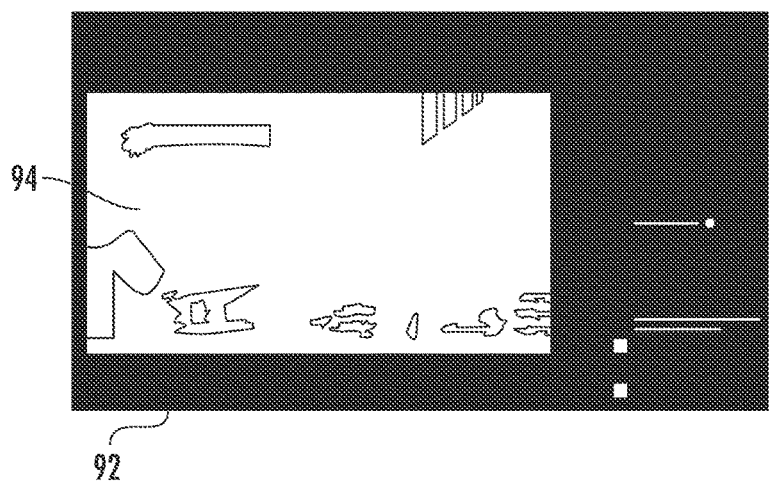
FIG. 5A is a visual depiction of a region on the display device having a high Accumulated Difference according to one embodiment.
Figure 5B:
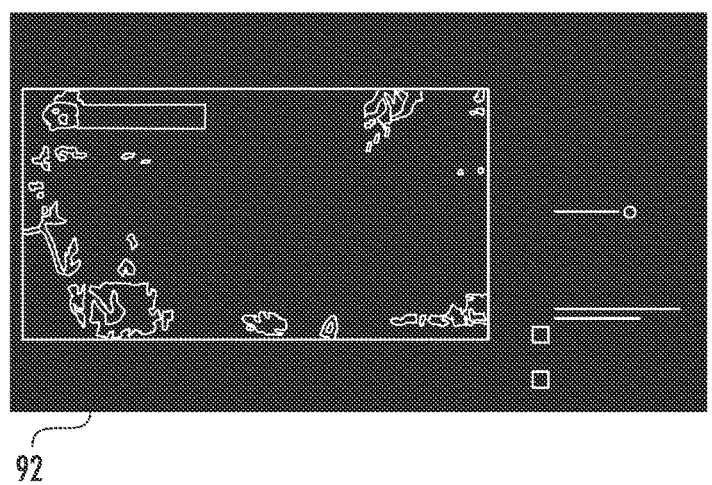
FIG. 5B depicts example edge binary image output from edge detection according to one embodiment.
Figure 5C:
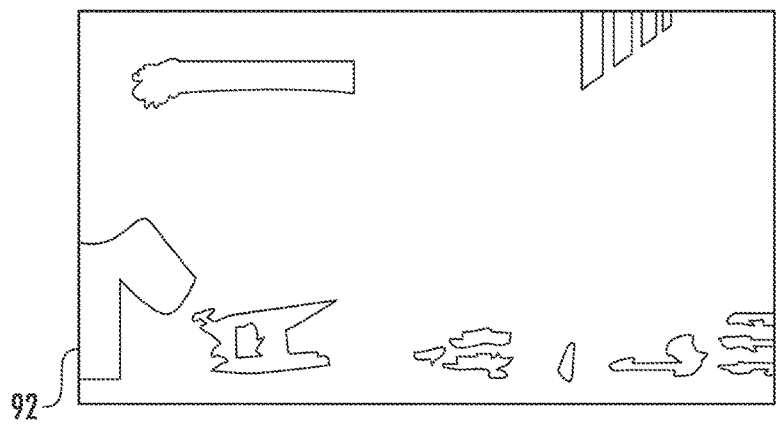
FIG. 5C depicts an example of region of interest scaled up to fit the full display area according to one embodiment.

Referring to FIGS. 5A, 5B, and 5C visually depict an embodiment of region of interest detection. FIG. 5A, for example, provides a visual depiction of a region of interest 94 within a full display area 92, which may be a display area of a display device. In this particular figure, the region 94 having a high Accumulated Difference is shown to be brighter than the other parts of the display area 92, therefore indicating that the bright region 94 is the region of interest. (i.e., the white areas correspond to a region of interest and the black areas correspond to static images). FIG. 5A may be thought of as depicting the process that happens at stage 22 of FIG. 2.

FIG. 5B shows example edge binary image output from edge detection, such as edge binary image output produced from stage 26 of FIG. 2, for example. As the process moves forward to determine the region of interest, the edges/lines around the rectangular area will be highlighted as a candidate for scaling up (stage 62 of FIG. 4). FIG. 5C depicts the case where a user confirms that the highlighted rectangular area is indeed the region of interest, and the region is scaled up to fit the entire display area 92. In the scaled-up version, the data that is shown outside the active video area in FIG. 5A and FIG. 5B remain hidden. As mentioned above, in one embodiment, the scaling entails identifying a center of the region of interest and aligning it with a center of the display area, then applying a zoom factor that is determined mathematically based on the dimensions of the region of interest and the aspect ratio of the display device.

Figure 6:
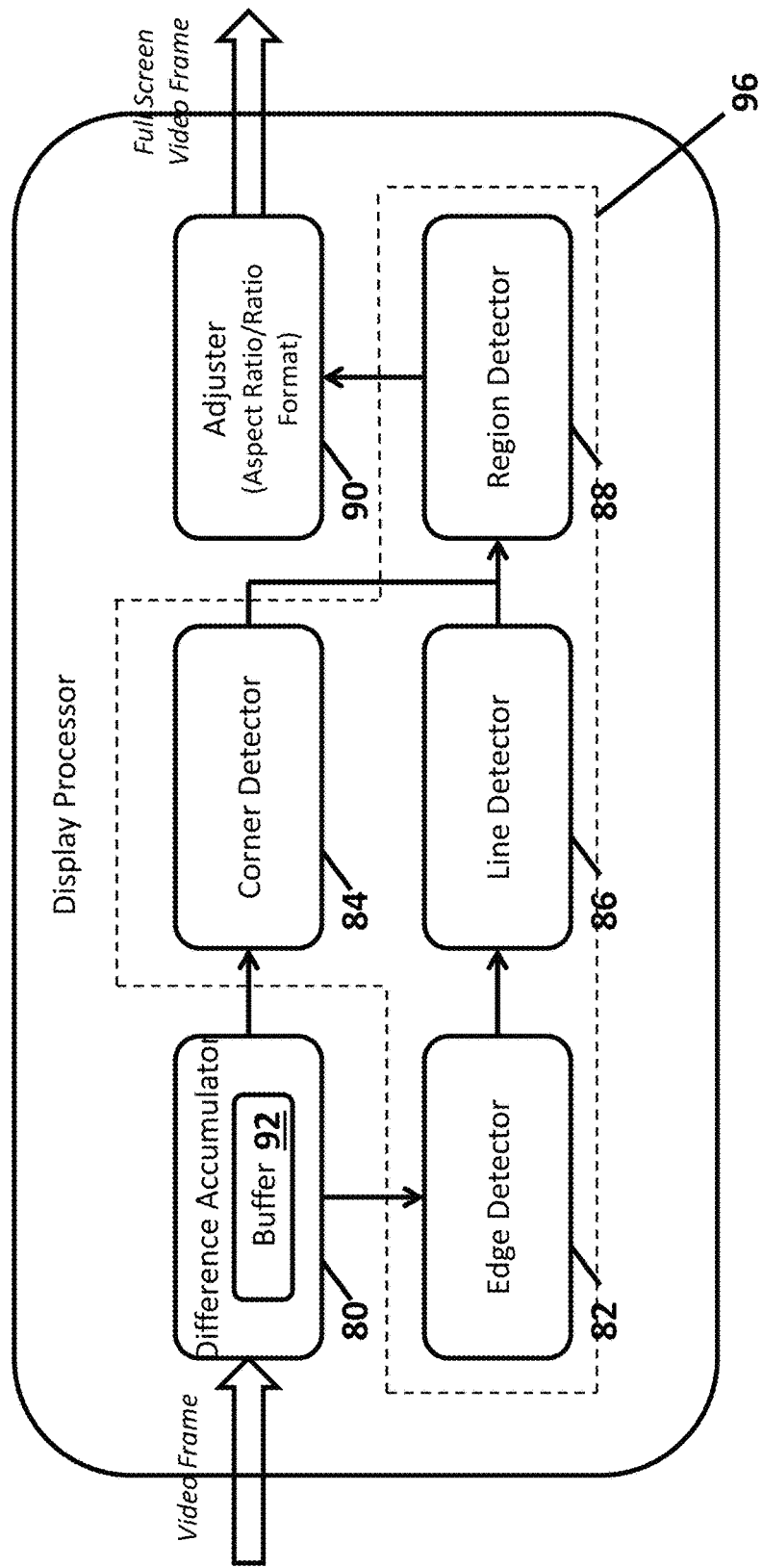
FIG. 6 depicts an example functional block diagram of a display processor that may be used to implement one embodiment of the region of interest detection and scale-up method disclosed herein.

FIG. 6 depicts a functional block diagram of an embodiment of a display processor that may be used to implement the region of interest detection and automatic scaling processes described above. As shown, video frames are received by a Difference Accumulator 80 having a Buffer 82. An Edge Detector 82, a Corner Detector 84, a Line Detector 86, and a Region Detector 88 work together to determine a region of interest, as depicted in FIG. 2. A "detector" 96, as used herein, includes at least one of the Edge Detector 82, Corner Detector 84, Line Detector 86, and Region Detector 88, as shown, for example, in FIG. 6. Furthermore, an Adjuster 90 may determine the aspect ratio and may adjust the aspect ratio if necessary. These detectors and the adjuster may be implemented as software or non-transitory computer-readable instructions that are stored in a medium. In various embodiments, operating system software of a system that includes the display processor may provide an operating environment for softwares executing in the computer system, and may coordinate activities of the components of the computer system.

Various embodiments of the system that includes the display processor may be implemented with or involve one or more computer systems. The computer system is not intended to suggest any limitation as to the scope of use or functionality of described embodiments. The computer system includes at least one processor and memory, one or more input devices, one or more output devices, and one or more communication connections. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In one embodiment, the memory may store software for implementing various embodiments of the disclosed concept.

To provide for interaction between a user and the display processor, embodiments can be implemented using a computer having a display device, e.g., a CRT (cathode ray tube), LCD (liquid crystal display), projection screen, OLED display, 3D display, etc. for displaying information to the participants. A touchscreen, a keyboard and a pointing device, e.g., a mouse or a trackball, by which a user can provide input to the computer are also provided. Other kinds of devices can be used to provide for interaction with participants as well; for example, feedback provided to the player can be any form of sensory feedback, e.g. visual feedback, auditory feedback, or tactile feedback; and input from the user can be received in any form, including acoustic, speech, brain waves, other physiological input, eye movements, gestures, body movements, or tactile input. For example, any of the above methods may be used to make a "selection" of the region of interest by confirming the highlighted rectangular area.

While this specification contains many specifics, these should not be construed as limitations on the scope of the disclosure as a whole or of what can be claimed. Rather, the examples provided should be viewed as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as being executed in certain combinations in certain order, one or more features from a disclosed combination may in some cases be omitted from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Various embodiments of the present invention may be described in the general context of computer-readable media. Computer-readable media are any available media that may be accessed within a computer system. By way of example, and not limitation, within the computer system, computer-readable media include memory, storage, communication media, and combinations thereof.

It should be understood that the invention can be practiced with modification and alteration within the spirit and scope of the disclosure and the appended claims. The description is not intended to be exhaustive or to limit the inventive concept to the precise form disclosed.

What is claimed is:

1. A method of identifying and scaling a region of interest on a display device having a display area, comprising:
    detecting a region of interest based on rate of data change between frames, comprising:
        generating an accumulated difference based on a video data of a current frame (t), a first prior frame (t-1), and a second prior frame (t-2);

comparing the accumulated difference with a predetermined difference value;
determining a size of the display area and aspect ratio; and
scaling the region of interest to fit the display area in full screen mode based on detected size of the display area and the aspect ratio.

2. The method of claim 1, wherein generating the accumulated difference comprises:
receiving the video data of the current frame (t), the first prior frame (t-1), and the second prior frame (t-2);
determining a first difference between data of the first prior frame (t-1) data and data of the current frame (t);
determining a second difference between data of the prior frame (t-1) and data of the second prior frame (t-2);
adding the first difference and the second difference to generate the accumulated difference; and
wherein the video data is uncompressed.

3. The method of claim 2, further comprising adding differences from a preset number of sequential frames before comparing the accumulated difference with the predetermined difference value.

4. The method of claim 1 further comprising detecting edges of the region of interest.

5. The method of claim 4, wherein detecting edges of the region of interest comprises:
performing an edge detection on the accumulated differences to generate an edge binary image output;
performing a Hough transform on the edge binary image output to determine a plurality of lines.

6. The method of claim 5, wherein edge lines are selected from the plurality of lines based on a direction in which the edge lines extend relative to edges of the display device.

7. The method of claim 5, wherein edge lines are selected from the plurality of lines based on extending in a direction that is either parallel to an edge of the display device or forms a 90-degree angle with respect to the edge of the display device.

8. The method of claim 5, wherein at least some of the plurality of lines extend neither parallel nor perpendicularly to an edge of the display device, wherein the scaling further comprises rotating the region of interest.

9. The method of claim 5 further comprising detecting corners of the region of interest.

10. The method of claim 9, wherein detecting corners of the accumulated differences comprises:
performing corner detection to identify at least one potential corner location of the region of interest;
comparing the at least one potential corner location to the plurality of lines.

11. The method of claim 10 further comprising determining a rectangle outline of the region of interest.

12. The method of claim 11, wherein determining the rectangle outlining the region of interest comprises:
displaying a potential active region;
receiving confirmation or rejection from a user that the potential active region corresponds to the active region;
if rejection from a user is received, display another potential active region.

13. The method of claim 1, wherein detecting the region of interest based on the rate of data change between frames comprises determining a rate of change for each of R, G, and B channels, and
wherein determining the rate of change for each of R, G, and B channels comprises generating the accumulated difference and comparing the accumulated difference.

14. The method of claim 1, wherein scaling the region of interest comprises:
adjusting the aspect ratio of the region of interest; and
scaling the region of interest to fill the display area.

15. The method of claim 1, wherein the scaling further comprises:
determining a center for the region of interest, and
placing the center at a center of the display area.

16. The method of claim 1, wherein the region of interest is an active video display region.

17. A system for identifying and scaling a region of interest on a display device having a display area, the system comprising:
a detector configured to detect a region of interest based on rate of data change between frames;
an adjuster configured to determine a size of the display area and aspect ratio and scale the region of interest to fit the display area in full screen mode based on detected size of the display area and the aspect ratio; the detector comprises:
an edge detector configured to perform an edge detection on accumulated differences to generate an edge binary image output;
a line detector configured to perform a Hough transform on the edge binary image output to determine a plurality of lines;
a corner detector configured to detect corners of the region of interest; and
a region detector configured to detect the region of interest based on an output from each of the edge detector, the line detector, and the corner detector.

18. The system of claim 17, wherein detecting corners of the region of interest comprises:
performing corner detection to identify at least one potential corner location of the region of interest;
comparing the at least one potential corner location to the plurality of lines.

19. A computer readable non-transitory storage medium storing instructions for identifying and scaling a region of interest on a display device having a display area, the instructions when executed by a display processor cause the display processor to perform the steps of:
detecting a region of interest based on rate of data change between frames, comprising:
generating an accumulated difference based on a video data of a current frame (t), a first prior frame (t-1), and a second prior frame (t-2);
comparing the accumulated difference with a predetermined difference value;
determining a size of the display area and aspect ratio; and
scaling the region of interest to fit the display area in full screen mode based on detected size of the display area and the aspect ratio.

20. The method of claim 13, wherein generating the accumulated difference comprises:
receiving the video data of a current frame (t), a first prior frame (t-1), and a second prior frame (t-2), the video data each comprising an R channel, a G channel, and a B channel;
extracting R channel data from the R channel of each of the current frame (t), the first prior frame (t-1), and the second prior frame (t-2);
extracting G channel data from the G channel of each of the current frame (t), the first prior frame (t-1), and the second prior frame (t-2);
extracting B channel data from the B channel of each of the current frame (t), the first prior frame (t-1), and the second prior frame (t-2);

determining a first R channel difference, a first G channel difference, and a first B channel difference by respectively substracting the R channel data, the G channel data, and the B channel data of the current frame (t) from the R channel data, the G channel data, and the B channel data of the first prior frame (t-1) data;

determining a second R channel difference, a second G channel difference, and a second B channel difference by respectively substracting the R channel data, the G channel data, and the B channel data of the first prior frame (t-1) from the R channel data, the G channel data, and the B channel data of the second prior frame (t-2) data;

adding all of the first and second R channel difference, the first and second G channel difference, and the first and second B channel difference to generate the accumulated difference.

\* \* \* \* \*